United States Patent [19]

Hall, Jr.

[11] Patent Number: 5,167,423
[45] Date of Patent: Dec. 1, 1992

[54] TRAILER HITCH

[76] Inventor: John E. Hall, Jr., P.O. Drawer 1445, Ruidoso, N. Mex. 88345-1445

[21] Appl. No.: 647,929

[22] Filed: Jan. 30, 1991

[51] Int. Cl.⁵ .............................................. B60D 1/145
[52] U.S. Cl. ................................... 280/486; 280/483; 280/491.1; 280/493; 280/495; 280/503
[58] Field of Search ...................... 280/495, 483, 478.1, 280/503, 485, 489, 474, 491.5, 514, 491.1, 493, 486, 496

[56] References Cited

U.S. PATENT DOCUMENTS

| | | | |
|---|---|---|---|
| 1,118,236 | 11/1914 | Roedel | 280/503 |
| 1,426,938 | 8/1922 | Wright | 280/496 |
| 1,495,306 | 5/1924 | Holmes | 280/503 |
| 1,521,052 | 12/1924 | Silva | 280/496 |
| 2,255,624 | 9/1941 | Luse | 280/483 |
| 2,397,001 | 3/1946 | Goodwin | 280/503 |
| 2,711,908 | 6/1955 | Saxon | 280/489 |
| 2,729,470 | 1/1956 | Seitz | 280/483 |
| 2,743,118 | 4/1956 | Dotson | 280/478.1 |
| 3,265,406 | 8/1966 | Russell | 280/489 |

FOREIGN PATENT DOCUMENTS

| | | | |
|---|---|---|---|
| 0145555 | 12/1935 | Fed. Rep. of Germany | 280/483 |
| 0848584 | 11/1939 | France | 280/495 |
| 0636458 | 3/1962 | Italy | 280/493 |

Primary Examiner—Charles A. Marmor
Assistant Examiner—Anne Marie Boehler
Attorney, Agent, or Firm—Munson H. Lane, Jr.

[57] ABSTRACT

An improved hitch for connecting a trailer to the rear axle of a towing vehicle includes an elongated resilient steel drawbar having opposite end sections, an intermediate section offset from at least one of the opposite end sections and an inclined bend section integrally connecting the intermediate section to the at least one opposite end section. The drawbar is solid and rectangular in cross section. A clamp rigidly and removably clamps one end of the drawbar to the tongue of a trailer with the greatest cross sectional dimension of the drawbar substantially horizontal and with the lesser cross sectional dimension substantially vertical. A pivotal support for the other end of the drawbar is mounted on the rear axle of the towing vehicle with a pivot pin extending vertically through the drawbar behind and adjacent to the center of the axle.

18 Claims, 2 Drawing Sheets

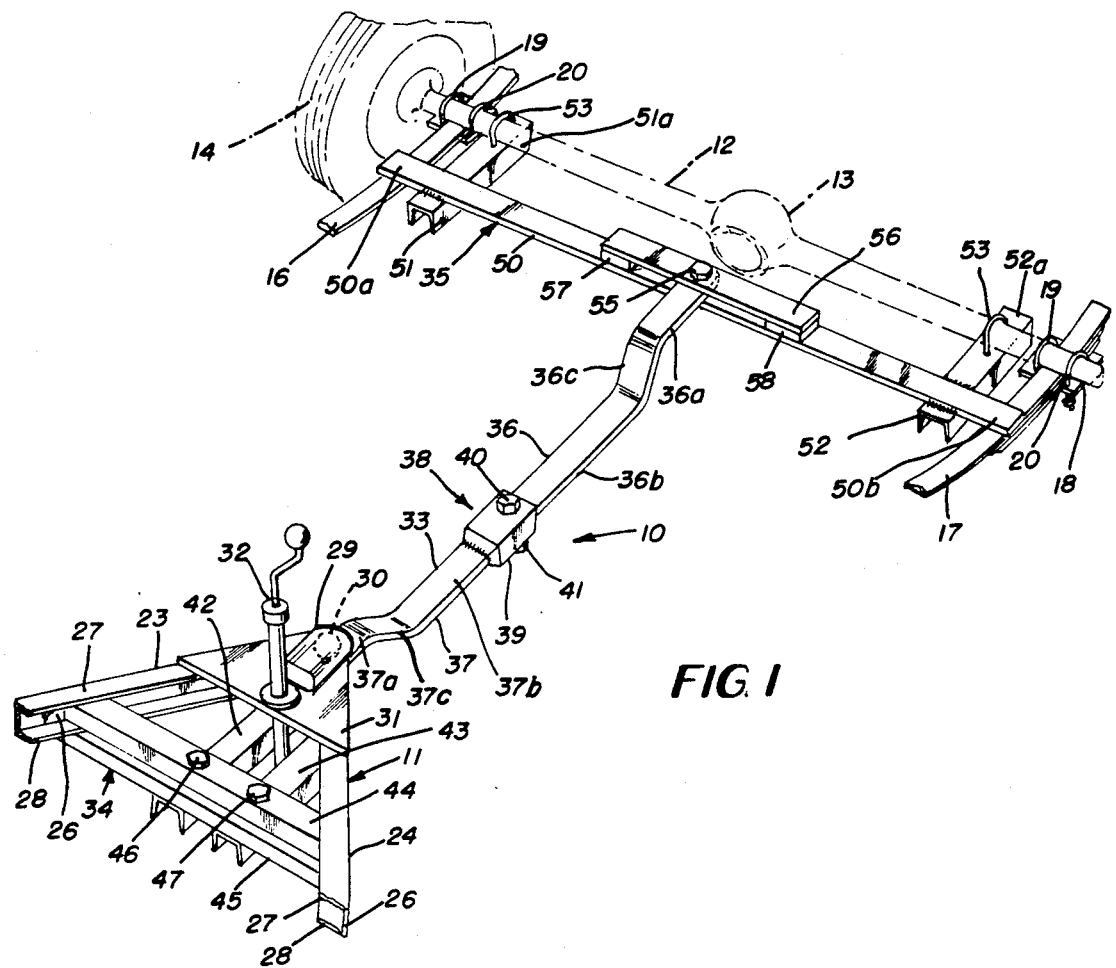
FIG. 1
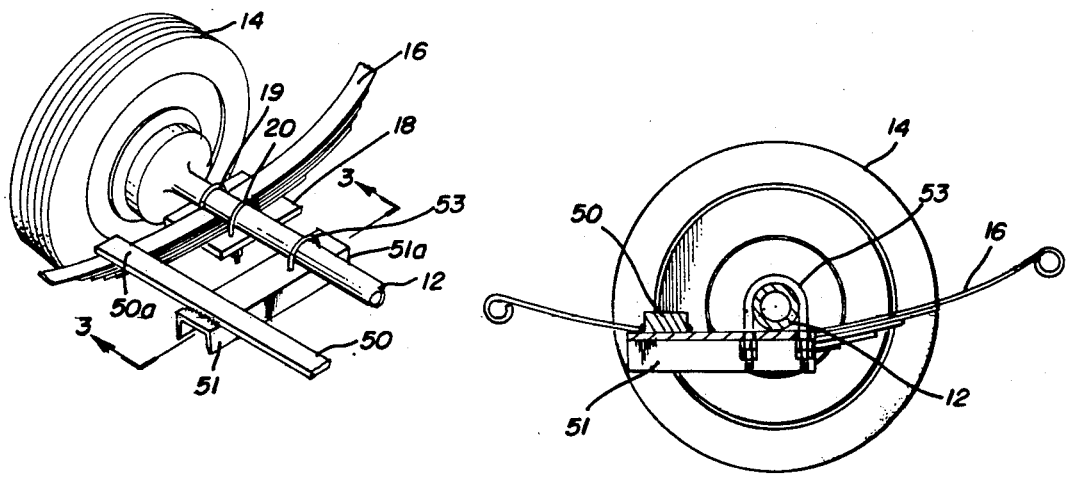
FIG. 2
FIG. 3

TRAILER HITCH

BACKGROUND OF THE INVENTION

1. Field of Invention

This invention relates to an improved hitch for attaching a trailer to a towing vehicle, such as, an automobile or a light truck for travel over the highways at normal traffic speeds.

2. Description of the Prior Art

The present invention has been designed to reduce or eliminate some of the problems frequently found in trailer towing.

The three principle problems involved in trailer towing are commonly referred to as fishtailing, tail dragging and bumps, surges, pitching and rolling.

Fishtailing is side to side turning and swaying of the trailer. This cyclic motion frequently causes loss of control of the towing vehicle and many accidents. Fishtailing happens primarily with systems having the pivot point of the hitch located between the trailer and the towing vehicle. Fishtailing may be relieved by: (a) moving the pivot closer to the axle of the towing vehicle; (b) use of anti-sway bars for partial relief: (c) attaching the pivot to the axle between wheels for maximum control; and (d) moving the trailer load toward its axle or axles to reduce swing inertia.

Tail dragging is the weighting down of the rear of the towing vehicle by trailer tongue load. This fault usually tilts up the front of the towing vehicle changing the caster and the camber of the front wheels which causes road wandering and steering difficulties. Tail dragging may be relieved by: (a) use of equalizer bars to lift the rear of the towing vehicle and level same: (b) moving the hitch pivot closer to the rear axle of the towing vehicle to reduce tilting: (c) attaching the hitch pivot to the rear axle of the towing vehicle to take weight off the frame of the towing vehicle: and (d) moving the trailer load to the rear of the trailer to reduce tongue load.

Bumps, surges, pitching and rolling, usually resulting from road unevenness, causes the trailer and towing vehicle to work against each other as first one and then the other responds to the unevenness of the road surface and tries to adjust itself against the resistance of its partner. Bumps, surges, pitching and rolling may be relieved by: (a) isolating the forces produced by changing the connection of the hitch from the frame to the axle of the towing vehicle; (b) reducing the transmitted intensity of forces by increasing isolation between vehicles with: (1) providing a longer drawbar: (2) providing a non-rigid drawbar having: (a) vertical resilience (spring give up and down): (b) longitudinal resilience (forward and backward); (c) twist resilience (roll compensation): (d) strong, almost rigid, side-to-side horizontal strength; and (e) using surge brakes on trailer to reduce trailer breaking forces.

In non fifth wheel hitch arrangements commonly used for towing a trailer behind an automobile or light truck the hitch includes a rearwardly extending drawbar mounted on the rear end of the towing vehicle with a ball connector fastened to the rear end of the drawbar. A ball receiving socket is secured at the front end of a tongue extending forwardly from the trailer. When the ball receiving socket is secured in place over the ball, the ball and socket provide a pivot point for the hitch about which the towing vehicle can turn relative to the trailer. The pivot point of the conventional hitch just described is most commonly located between the towing vehicle and the trailer.

When the pivot point of the hitch is between the towing vehicle and a trailer, excessive swaying of the trailer relative to the towing vehicle often occurs as a result of the bow wave of wind produced by a large passing vehicle, such as a bus, or truck. As the bus, or truck, passes the towing vehicle and trailer going in the same direction, the bow wave of wind pushes first against the rear of the trailer resulting in a force being applied to the towing vehicle which causes the towing vehicle to turn toward the near side of the road. The bow wave then progresses forwardly pass the trailer wheels and changes the direction of sway to turn the towing vehicle toward the middle of the road. As the bow wave passes the rear wheels of the towing vehicle, the sway again changes direction pushing the towing vehicle toward the side of the road again.

When the passing bus or truck is traveling in the opposite direction to the direction of travel of the towing vehicle and trailer, the bow wave generated by the bus or trailer first hits the front of the towing vehicle and progresses rearwardly thereof and then passes from the front to rear of the trailer. The bow wave thereby causes sway producing forces to act on the towing vehicle and trailer in the reverse order of the sway producing forces produced by a bus or truck traveling in the same direction as the towing vehicle.

Various factors, such as vehicle size, passing speeds, system resonant frequencies, wind strength and direction, driver reactions, roadside hills and cuts, and wind shear conditions affect the sway problem. These factors often combine in such a way that the excessive sway generated can and does cause many trailer accidents every year.

One way to reduce the effect of sidewise trailer sway on a towing vehicle is to locate the pivot point at which the trailer is connected to the towing vehicle adjacent to the rear axle of the towing vehicle. This reduces the moment arm between the pivot point and the rear wheels of the towing vehicle resulting in less torque being applied to the towing vehicle by trailer sway than is the case when the pivot joint extends a substantial distance to the rear of the towing vehicle.

Patents which disclose trailer hitches which locate the pivot point between the trailer and the towing vehicle behind and adjacent to the rear axle of the towing vehicle include the following: U.S. Pat. Nos. 1,118,236, 2,255,624, 2,397,001, 2,729,470 and 2,743,118. Each of the aforesaid patents disclose special arrangements in the hitch structure for allowing limited relative movement between the trailer and towing vehicle as required to compensate for uneven road surfaces, etc. and to provide the necessary resilience to reduce the transfer of shock between vehicles.

SUMMARY OF THE INVENTION

It is an object of the present invention to provide an improved trailer hitch which reduces the common problems of trailer towing, including fishtailing, tail dragging, and bumps, surges, pitching and rolling in order to increase safety and to increase the comfort of the driver and passengers of the towing vehicle.

It is a further object of this invention to provide a hitch of simplified construction which does not require the addition of anti-sway bars, equalizer bars and other auxiliary components sometimes used to reduce the common towing problems.

It is still a further object of this invention to provide a hitch which has a specially designed elongated drawbar for rigid connection at one end to the tongue of a trailer and for pivotal connection at its other end to the rear of the towing vehicle at a pivot point located behind and adjacent to the longitudinal center of the rear axle of the towing vehicle.

It is still a further object of this invention to provide a drawbar made of a resilient solid steel bar of substantially uniform rectangular cross section throughout its length which is connected between the trailer and the towing vehicle with its widest dimension (width) substantially horizontal and with its narrowest dimension (thickness) substantially vertical thus giving the drawbar greater resilient flexibility in the vertical plane than in the horizontal plane.

It is still a further object of this invention to provide the drawbar of this invention with longitudinal resilient flexibility by offsetting the intermediate section of the drawbar relative to the ends of the drawbar in a manner such that the intermediate section is connected to the opposite ends of the drawbar by inclined bend sections.

It is still another object of this invention to increase the ease of connecting and disconnecting the trailer to the towing vehicle by providing a quick connect/disconnect socket coupling in the intermediate section of the drawbar.

It is still a further object of this invention to provide clamping means for rigidly clamping one end of the drawbar to the trailer tongue.

It is still another object of this invention to provide a support for pivotally connecting the drawbar to the towing vehicle which is removably mounted on the rear axle housing of the towing vehicle.

Considering in greater detail the structural features of a preferred embodiment of the present invention the hitch has a pivotal connection between a trailer and a towing vehicle including a vertical pivot located behind and adjacent to the center of the rear axle of the towing vehicle. A drawbar having inherent resilience silence is rigidly and removably secured at one end to the tongue of the trailer and it is pivoted at its other end by the vertical pivot to swing in a substantially horizontal plane. The inherent resilience of the drawbar along with the pivotal connection of the drawbar adjacent to and behind the rear axle of the towing vehicle provides for limited relative motion between the trailer and the towing vehicle.

The hitch drawbar is a rectangularly cross-sectioned solid bar of resilient steel having a greater width than thickness whereby the bar is capable of greater flexing through its thickness than through its width. With the drawbar supported so that its width lies in a substantially horizontal plane and its thickness lies in a substantially vertical plane behind the tow vehicle, the bar is relatively rigid in the horizontal plane and is capable of resilient flexing in the vertical plane.

The drawbar includes two opposite end sections and a straight intermediate section offset from both opposite end sections. The intermediate section is integrally connected to the end sections by inclined bend sections. The bend sections permit limited longitudinal movement of the trailer relative to the towing vehicle because the drawbar intermediate section is capable of longitudinal movement relative to its end sections as a result of resilient flexing of the bend sections. The angles connecting the relatively straight bend sections to the offset intermediate section and to the respective opposite end to which each bend section is connected are preferably obtuse angles. The obtuse angles which the bend sections make to the offset intermediate section and to a respective end section will generally be selected in accordance with the load for which the hitch is designed. The obtuse angle required for light loads is less than that required for heavy loads.

The width and thickness of the drawbar and the material from which the drawbar is made will also be selected in accordance with the load for which the hitch is designed. Spring steels having the required strength and resilience are the preferred drawbar materials.

The support for the front end of the drawbar is a flat horizontal support bar having opposite ends which overlie the towing vehicle leaf springs on opposite sides of the towing vehicle. The support bar is mounted to the rear of and close to the rear axle housing of the towing vehicle in generally parallel relationship thereto by forwardly extending axle clamping bars fixed inwardly of the opposite ends of the support bar. The forward ends of the clamping bars are secured under the axle housing just inside of the rear springs by U-bolts and nuts. The front end of the drawer bar is pivotally supported on top of the support bar by a pivot pin extending vertically through aligned holes in the drawbar and in the support bar. A flat bar spaced centrally above the support bar by spacer blocks, of a height slightly greater than the thickness of the drawbar, provides a track for restricting the pivotal motion of the drawbar to planar motion about the pivot pin. The drawbar is rigidly attached at its rear end to the trailer tongue. A quick connect and disconnect socket coupling is provided in the intermediate offset section of the tow bar for ease in connecting the trailer and towing vehicle without having to crawl under the towing vehicle to connect and disconnect the front of the drawbar to the support bar by placing or removing a pivot pin.

The location of the pivot point between the rear wheels and behind and adjacent to the center of the rear axle of the towing vehicle gives excellent control over fishtailing. The rigidity of the drawbar across its width controls turns without damping vertical resilience. The spring characteristics of the drawbar give excellent response, control and isolation of the bumps, surges and motion differences between the trailer and towing vehicle. Small to medium longitudinal stresses between the vehicle are absorbed and isolated by the central offset section of the drawbar. The drawbar was designed with the central offset section to remove some of its longitudinal rigidity and to give a calculated resilience in order to absorb road bumps and surges and the sometime sudden onsets of braking or acceleration. The remote but real dangers of a towing vehicle being overturned by an upset trailer linked through the hitch mechanism is greatly reduced, if not totally eliminated, by the twist flexibility of the drawbar. The normal twist flexibility of the drawbar is increased by the offset center section of the drawbar.

The hitch transmits less strain, wear and/or damage to the axle housing, differential and drive shaft of the towing vehicle because of the widely spaced attachments of the drawbar support bar to the axle housing than do hitch units which are attached to the axle near the axle center.

The attachment of the hitch of this invention to the rear axle rather than to the body frame of the towing vehicle gives added isolation of the body from shocks and bumps, thereby increasing ride comfort for the driver and passengers and reducing their fatigue.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 1 is a perspective view showing the trailer hitch of the invention connected between the front tongue of a trailer and the rear axle housing of a towing vehicle;

FIG. 2 is a perspective view of the left hand rear wheel and left hand portion of the rear axle housing of the towing vehicle showing the support for the transverse member of the trailer hitch on the left hand portion of the rear axle housing;

FIG. 3 is a sectional view taken on line 3—3 of FIG. 2;

DETAILED DESCRIPTION OF THE INVENTION

Figure 4:
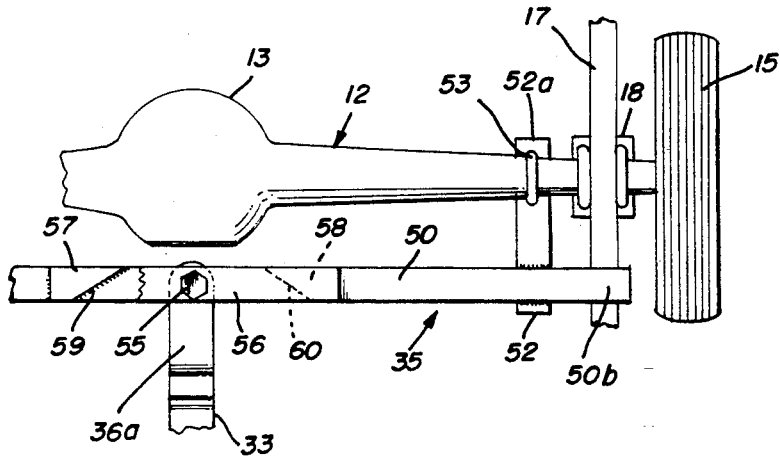
FIG. 4 is a partial top plan view of the rear axle housing of the towing vehicle and of the front portion of the trailer hitch mounted thereon.

Referring to the drawings and particularly to FIG. 1, the invention as indicated by reference numeral 10, is a trailer hitch connecting a conventional trailer tongue generally indicated at 11 to the rear axle housing 12 of a tow vehicle. The rear axle housing 12 includes a centrally located differential housing 13 and extends between the left and right hand rear wheels 14 and 15 respectively of the towing vehicle in a conventional manner. The rear end of the body (not shown) of the towing vehicle is resiliently supported upon the rear axle housing 12 by rear springs 16 and 17. The springs 16 and 17 are each conventionally clamped to the left and right hand end portions of the axle housing 12 respectively by a plate 18 located beneath the spring and a pair of U-bolts 19 and 20 which straddle the axle housing 12 and extend through the plate 18 where the ends of the U-bolts are secured by locking nuts 21 and 22.

The trailer tongue 11 is of conventional construction comprising forwardly converging left and right hand channel irons 23 and 24 which are secured at their rear ends to the trailer 25. Looking at FIG. 6 only the right hand channel iron 24 is seen connected to the trailer 25, however, it will be understood that the left hand channel iron is connected to the trailer in a similar manner. The channel irons 23 and 24 open inwardly each with its web portion 26 extending vertically and with its flanges 27 and 28 parallel and extending inwardly from opposite edges of the web 26. A ball receiving socket member 29 is mounted at the front ends of the channel irons 23 and 24 so as to extend forwardly thereof for connection to a ball 30 mounted on a drawbar 33 which is part of the trailer hitch 10 of this invention. A triangular plate 31, welded to the top flanges of the channel irons 23 and 24, provides a support for a trailer jack 32.

The trailer hitch of this invention comprises a drawbar 33, a clamping assembly 34 for coupling the rear end portion of the drawbar 33 to the trailer tongue 11 and support means 35 mounted on the rear axle housing of the towing vehicle on which the front end of the drawbar 33 is pivotally mounted to swing in a substantially horizontal plane.

Figure 6:
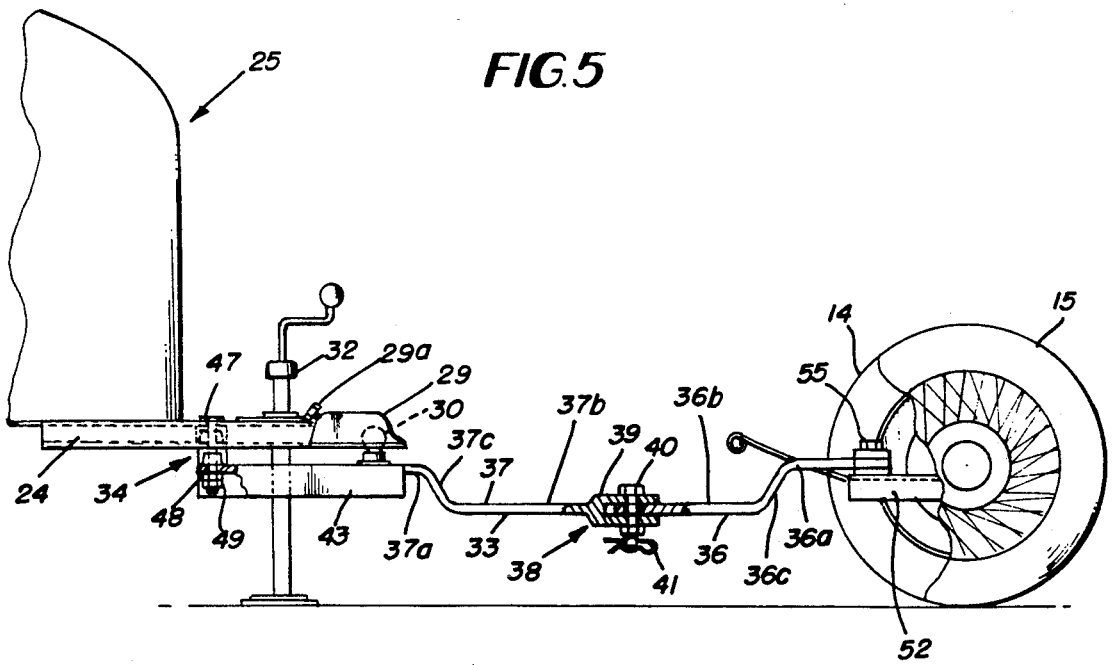
FIG. 6 is a right side elevational view of the trailer hitch shown in FIG. 1 connected between the front tongue of a trailer and the rear end of the towing vehicle with a portion of the right rear vehicle wheel broken away to show the front portion of the trailer hitch between the rear vehicle wheels.

The drawbar 33 as best seen in FIGS. 1 and 6 comprises a front end section 36, a rear end section 37 and a quick connect and disconnect coupling 38. The coupling 38 comprises a hollow socket member 39 welded at one end to the rear end section 37 and open at its other end to receive the rear end portion of the front drawbar section 36. A pin 40 extends downwardly through vertically aligned openings (not visible) in the socket 39 and an opening through the rear end portion of the front end section 36 to secure the front end section 36 in the socket 39. A hitch pin clip 41, or other suitable fastener, secures the hitch pin 40 in place in the coupling 39.

The drawbar sections 36 and 37 are made of solid spring steel bar stock of rectangular cross section having a width substantially greater than its thickness. Because of the greater width to thickness of the drawbar, the drawbar is more flexible across its thickness than across its width.

Each of the drawbar sections 36 and 37 have elevated horizontal end portions 36a and 37a and downwardly offset horizontal portions 36b and 37b which are connected to the elevated end portions 36a and 37a by inclined bend portions 36c and 37c respectively. The downwardly offset horizontal portions 36b and 37b together with the quick connect and disconnect coupling 38 form an intermediate downwardly offset portion in the profile of the drawbar 33 as seen in FIG. 6. The inclined bend portions 36c and 37c allow resilient bending of the otherwise longitudinally rigid drawbar 33 in order to absorb longitudinal shock and impact forces applied longitudinally to the ends of the drawbar.

The ball 30 is mounted on top of the elevated horizontal end portion 37a adjacent to the rear end thereof and is secured thereon by a conventional threaded bolt and nut fastening means. A pair of channel irons 42 and 43 are welded on opposite sides of the elevated horizontal end portion 37a and extend rearwardly therefrom in horizontally spaced parallel relationship. The channel irons 42 and 43 open downwardly as seen in FIG. 1.

The clamping means 34 (best seen in FIG. 1) comprises upper and lower transverse clamping bars 44 and 45 secured in vertically spaced relationship across the tops of the channel irons 42 and 43 adjacent to the rear ends thereof by bolts 46 and 47. The opposite ends of the upper transverse clamping bar 44 rest on top of the bottom flanges 28 of the trailer tongue channel irons 23 and 24. The opposite ends of the lower clamping bar 45 extend under the bottom flanges 28 of the trailer tongue channel irons 23 and 24. The bolts 46 and 47 extend downwardly through close fitting apertures (not visible) in the clamping bars 44 and 45 and through close fitting apertures in the top web of the channel irons 42 and 43 into the open channels of the channel irons. A clamping nut 48 is threaded onto each of the bolts 46 and 47 and tightened to draw the clamping bars 44 and 45 together so as to clamp the lower flanges 28 of the trailer tongue channel irons 23 and 24 securely between the opposite ends of the clamping bars. After the clamping nuts 48 are tightened to securely clamp the lower flanges of the channel irons 23 and 24 between the upper and lower clamping bars 44 and 45, lock nuts 49 are threaded onto the bolts 46 and 47 to lock the nuts 48 in tightened position.

The support means 35 secured to the axle housing 12 of the towing vehicle for pivotally mounting the front end of the drawbar 33 to pivot in a generally horizontal plane comprises a transverse support bar 50 positioned behind the axle housing 12 and left and right hand axle clamping bars 51 and 52 respectively secured adjacent to opposite ends of the transverse support bar 50 and extending forwardly therefrom. The forward ends 51a and 52a of the axle clamping bars 51 and 52 are positioned beneath the axle housing 12 on opposite sides of the differential housing 13 inside of and adjacent to the vehicle springs 16 and 17 respectively. The forward ends 51a and 52a are clamped tightly beneath the axle housing 12 by means of U-bolts 53 which straddle the axle housing 12. The clamping bars 51 and 52 are shown as being downwardly open channel members. The support bar 50 is welded to the tops of the axle clamping channel members 51 and 52 with its opposite ends projecting outwardly therefrom in overlying relationship to the vehicle springs 16 and 17. The vehicle springs 16 and 17 thereby provide underlying support for the transverse support bar preventing downward slippage rotation of the assembly under excessive loads and shocks.

Figure 5:
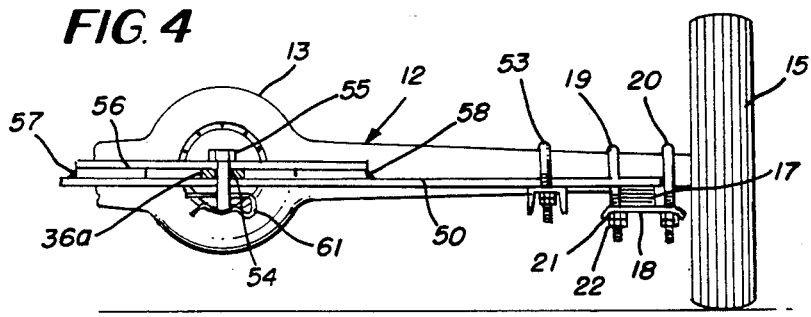
FIG. 5 is a partial rear elevational view of the rear axle housing of the towing vehicle and of the front portion of the trailer hitch mounted thereon.

A pivot aperture 54 extends downwardly through the longitudinal center of the support bar 50 for receiving a vertical pivot pin 55 about which the drawbar 33, supported on top of the support bar 50, is pivoted. A short bar 56 is supported above the support bar 50 in parallel spaced relationship thereto by spacer blocks 57 and 58 which are welded to the top of the support bar 50 on opposite sides of the aperture 54 at equal distances therefrom. The height of the blocks 57 and 58 is slightly greater than the thickness of the drawbar front end section 36 so that elevated end portion 36a can swing freely in the space between the support bar 50 and the short bar 56. The spacer blocks 57 and 58 also serve as limit stops to limit the angle through which the drawbar 33 can swing about the pivot pin 55. The inside edges of the blocks 57 and 58 are angled, as seen at 59 and 60 respectively in FIG. 4, for greater bearing contact with the side edges of the drawbar elevated end portion 36a at the outside limits of angular swing of the drawbar. The limitation upon the angular swing of the drawbar is selected to prevent the drawbar and trailer from contacting the towing vehicle, or parts thereof, when making short radius turns. The short bar 56 spaced above the support bar 50 limits the swinging motion of the drawbar to a plane substantially parallel to the planes of the upper surface of the support bar 50 and of the lower surface of the short bar 56. The headed pivot pin 55 is secured in position through vertically aligned holes in the short bar 56, the elevated end portion 36a of drawer bar 33 and in the support bar 50 by a hitch principle or other suitable securing means (FIG. 5).

In order to protect the underside of the towing vehicle from possible damage resulting from tilting of the drawbar 33, a guard bar or plate (not shown) may be secured to the underside of the towing vehicle above the drawbar 33. The guard bar is preferably in the form of a semicircular rail positioned rearwardly of the transverse support bar 50 with the pivot pin 55 (see FIG. 4) located at substantially the diametrical center between the ends of the semicircular guard bar and with the ends of the guard bar located over the support bar 50 so that the semicircular rail extends rearwardly therefrom.

While it has been previously stated herein that the improved hitch of this invention is for attaching a trailer to a towing vehicle, such as an automobile or a light truck, it should not be implied that the use of the hitch is limited to use with the types of towing vehicles named since the hitch is capable of more general application.

Also while the quick connect/disconnect coupling 38 is shown with the socket member 39 attached to the end section 37 of the drawbar 33, the arrangement of the coupling 30 can be reversed so that the socket member 39 is connected to the end section 36 so that it opens rearwardly to receive the end section 37 therein.

The invention has been described in detail for the purpose of illustration, but it will be obvious that numerous modifications and variations may be resorted to within the spirit and scope of the invention as claimed.

What is claimed is:

1. An improved trailer hitch for connecting a trailer to the rear end of a towing vehicle, for travel over highways at usual highway speeds, said trailer having a forwardly extending tongue rigid with said trailer and said towing vehicle having an elongated transverse rear axle housing with rear wheels mounted at opposite ends of said rear axle housing comprising an elongated resilient steel drawbar having opposite end sections, an intermediate section offset from at least one of said opposite end sections and at least one inclined bend section integrally connecting said at least one opposite end section to said intermediate section.

said drawbar having a substantially uniform rectangular cross section throughout its length with a width substantially greater than its thickness so that the drawbar has substantially greater rigidity in the direction of its width than in the direction of its thickness and has greater resilience in the direction of its thickness than in the direction of its width, said at least one inclined bend section giving said drawbar resilient longitudinal flexibility, said at least one inclined bend section forming an obtuse angle with said intermediate section and with the respective opposite end section to which it is connected, means for rigidly and removably connecting one end section of said drawbar to the tongue of the trailer with the width of said drawbar extending in a substantially horizontal direction and with its thickness extending in a substantially vertical direction, and means for pivotally supporting the other end section of said drawbar at a position behind and adjacent to the center of the rear axle housing of the towing vehicle.

2. The improved hitch of claim 1 wherein said intermediate section is offset from both of said opposite end sections and there is a bend section connecting each of said opposite end sections to said intermediate section.

3. The improved hitch of claim 1 wherein there is a quick connect/disconnect rigid socket coupling located in said intermediate section.

4. An improved trailer hitch for connecting a trailer to the rear end of a towing vehicle said trailer having a forwardly extending tongue rigid with the trailer and said towing vehicle having a rear axle, comprising an elongated resilient steel drawbar having opposite end sections, an intermediate section offset from said opposite end sections and inclined bend sections integrally connecting said opposite end sections to said intermediate section, said drawbar having a substantially uniform rectangular cross section throughout its length with a width substantially greater than its thickness so that the drawbar has substantially greater rigidity in the direction of its width than in the direction of its thickness and has greater resilience in the direction of its thickness than in the direction of its width, said inclined bend sections giving said drawbar resilient longitudinal flexibility, said opposite end sections being substantially coplanar and said intermediate section being offset in a plane substantially parallel to the plane of said opposite end sections, each of said inclined bend sections forming an obtuse angle with said intermediate section and with the respective opposite end section to which the bend section is connected, means for rigidly and removably connecting one end section of said drawbar to the tongue of the trailer with the width of said drawbar extending in a substantially horizontal direction and with its thickness extending in a substantially vertical direction, and means for pivotally supporting the other end section of said drawbar at a position behind and adjacent to the center of the rear axle of the towing vehicle.

5. The improved hitch of claim 4 wherein there is a quick connect/disconnect socket coupling located in said intermediate section.

6. The improved hitch of claim 4 wherein the obtuse angles each of said bend sections make with said intermediate section and with a respective one of said opposite end sections are substantially the same for each bend section.

7. The improved hitch of claim 4 wherein said means for rigidly and removably connecting one end section of said drawbar to the tongue of the trailer includes a ball coupling element mounted on said one end section of said drawbar for coupling with a socket element mounted on the trailer tongue and clamping means for rigidly clamping said one end section to the trailer tongue.

8. The improved hitch of claim 4 wherein said means for pivotally supporting said other end section of said drawbar at a position behind and adjacent to the center of the rear axle of the towing vehicle comprises an elongated flat transverse support bar having left and right ends, left and right axle clamping bars rigidly connected inwardly of and close to the left and right ends respectively of the transverse support bar, said axle clamping bars extending laterally from said transverse support bar in the same direction, means for clamping the right and left axle clamping bars to the rear axle of the towing vehicle for positioning the transverse support bar behind and to the rear of the rear axle of the towing vehicle in substantially parallel relationship to the rear axle, said transverse support bar having a flat upper bearing surface in at least the central portion thereof, a central pivot aperture extending through said support bar, a pair of spacer blocks rigidly secured to the upper surface of said transverse support bar, each spacer block being located outwardly from said central pivot aperture on a side thereof opposite from the location of the other spacer block equidistant from said central pivot aperture, a short bar rigidly mounted on said spacer blocks above and in parallel with said transverse support bar, an aperture extending centrally through said short bar in alignment with said central pivot aperture, said other end section of said drawbar being supported on the bearing surface of said transverse support bar, and having an aperture therethrough which is positioned in alignment with said central pivot aperture, a pivot pin extending through the aligned apertures in said short bar, in said other end of said drawbar and in said transverse support bar to provide a pivot for said drawbar and fastening means for removably securing said pivot pin in said aligned apertures.

9. The improved hitch of claim 8 wherein said spacer blocks serve as limit stops to limit the degree of angular movement of said drawbar, the distance of said spacer blocks from said central pivot aperture being selected in order to limit the angular movement of the drawbar about said pivot pin to an optimum angle within which the drawbar and trailer will avoid interference with the turning movement of the tow vehicle.

10. The improved hitch of claim 9 wherein the heights of said spacer blocks above said transverse support bar are just slightly greater than the thickness of said other end section of said drawbar in order for the short bar mounted on said spacer blocks to limit up and down movement of said drawbar on said pivot pin while allowing free pivotal motion of said drawbar about said pivot pin within the angular limits set by said spacer blocks.

11. The combination comprising a trailer having a forwardly extending tongue rigid with the trailer, a towing vehicle having a rear axle and an improved trailer hitch connecting the tongue of said trailer to the rear axle of said towing vehicle, said improved hitch comprising an elongated resilient steel drawbar having opposite end sections, an intermediate section offset from said opposite end sections and inclined bend sections integrally connecting said opposite end sections to said intermediate section, said drawbar having a substantially uniform rectangular cross section throughout its length with a width substantially greater than its thickness so that the drawbar has substantially greater rigidity in the direction of its width than in the direction of its thickness and has greater resilience in the direction of its thickness than in the direction of its width, said inclined bend sections giving said drawbar resilient longitudinal flexibility, said opposite end sections being substantially coplanar and said intermediate section being offset in a plane substantially parallel to the plane of said opposite end sections, each of said inclined bend sections forming an obtuse angle with said intermediate section and with the respective opposite end section to which the bend section is connected, means for rigidly and removably connecting one end section of said drawbar to the tongue of the trailer with the width of said drawbar extending in a substantially horizontal direction and with its thickness extending in a substantially vertical direction, and means mounted on the rear axle of said towing vehicle for pivotally supporting the other end section of said drawbar at a position behind and adjacent to the center of the rear axle of the towing vehicle.

12. The improved hitch of claim 11 wherein there is a quick connect/disconnect socket coupling located in said intermediate section.

13. The improved hitch of claim 11 wherein the obtuse angles each of said bend sections make with said intermediate section and with a respective one of said opposite end sections are substantially the same for each bend section.

14. The improved hitch of claim 11 wherein said means for rigidly and removably connecting one end section of said drawbar to the tongue of the trailer includes a ball coupling element mounted on said one end section of said drawbar for coupling with a socket element mounted on the trailer tongue and clamping means for rigidly clamping said one end section to the trailer tongue.

15. The improved hitch of claim 11 wherein said means for pivotally supporting said other end section of said drawbar at a position behind and adjacent to the center of the rear axle of the towing vehicle comprises an elongated flat transverse support bar having left and right ends, left and right axle clamping bars rigidly connected inwardly of and close to the left and right ends respectively of the transverse support bar, said axle clamping bars extending laterally from said transverse support bar in the same direction, means for clamping the right and left axle clamping bars to the rear axle of the towing vehicle for positioning the transverse support bar behind and to the rear of the rear axle of the towing vehicle in substantially parallel relationship to the rear axle, said transverse support bar having a flat upper bearing surface in at least the central portion thereof, a central pivot aperture extending through said support bar, a pair of spacer blocks rigidly secured to the upper surface of said transverse support bar, each spaced block being located outwardly from said central pivot aperture on a side thereof opposite from the location of the other spacer block equidistant from said central pivot aperture, a short bar rigidly mounted on said spacer blocks above and in parallel with said transverse support bar, an aperture extending centrally through said short bar in alignment with said central pivot aperture, said other end section of said drawbar being supported on the bearing surface of said transverse support bar, and having an aperture therethrough which is positioned in alignment with said central pivot aperture, a pivot pin extending through the aligned apertures in said short bar, in said other end of said drawbar and in said transverse support bar to provide a pivot for said drawbar and fastening means for removably securing said pivot pin in said aligned apertures.

16. The improved hitch of claim 15 wherein said spaced blocks serve as limit stops to limit the degree of angular movement of said drawbar, the distance of said spaced bars from said central pivot aperture being selected in order to limit the angular movement of the drawbar about said pivot pin to an optimum angle within which the drawbar and trailer will avoid interference with the turning movement of the tow vehicle.

17. The improved hitch of claim 16 wherein the heights of said spacer blocks above said transverse support bar are just slightly greater than the thickness of said other end section of said drawbar in order for the short bar mounted on said spacer blocks to limit up and down movement of said drawbar on said pivot pin while allowing free pivotal motion of said drawbar about said pivot pin within the angular limits set by said spacer blocks.

18. The combination comprising a trailer having a forwardly extending tongue rigid with the trailer, a towing vehicle for travel over highways at usual highway speeds having a rear axle housing and wheels mounted at opposite ends of the rear axle housing, and an improved hitch connecting the tongue of said trailer to the rear axle housing of said towing vehicle, said improved hitch comprising an elongated resilient steel drawbar having opposite end sections, an intermediate section offset from at least one of said opposite end sections and at least one inclined bend section integrally connecting said at least one opposite end section to said intermediate section, said drawbar having a substantially uniform rectangular cross section throughout its length with a width substantially greater than its thickness so that the drawbar has substantially greater rigidity in the direction of its width than in the direction of its thickness and has greater resilience in the direction of its thickness than in the direction of its width, said at least one inclined bend section giving said drawbar resilient longitudinal flexibility, said at least one inclined bend section forming an obtuse angle with said intermediate section and with the respective opposite end section to which it is connected, means for rigidly and removably connecting one end section of said drawbar to the tongue of the trailer with the width of said drawbar extending in a substantially horizontal direction and with its thickness extending in a substantially vertical direction and means for pivotally supporting the other end section of said drawbar at a position behind and adjacent to the center of the rear axle housing of the towing vehicle.

* * * * *